United States Patent
Blaser et al.

(10) Patent No.: US 10,427,187 B2
(45) Date of Patent: Oct. 1, 2019

(54) MIXER SYSTEM FOR PRODUCING TOPCOAT COMPOSITIONS AND COATING COMPOSITIONS USED AS FILLER

(71) Applicant: BASF Coatings GmbH, Muenster (DE)

(72) Inventors: Alexander Blaser, Ascheberg (DE); Sebastian Lenz, Werne (DE); Gabriele Bloemer, Neuss (DE); Julia Breuer, Duelmen (DE)

(73) Assignee: BASF COATINGS GmbH, Muenster (DE)

( * ) Notice: Subject to any disclaimer, the term of this patent is extended or adjusted under 35 U.S.C. 154(b) by 646 days.

(21) Appl. No.: 15/037,588

(22) PCT Filed: Nov. 18, 2014

(86) PCT No.: PCT/EP2014/074874
§ 371 (c)(1),
(2) Date: May 18, 2016

(87) PCT Pub. No.: WO2015/071489
PCT Pub. Date: May 21, 2015

(65) Prior Publication Data
US 2016/0296970 A1    Oct. 13, 2016

(30) Foreign Application Priority Data

Nov. 18, 2013 (EP) .................... 13193313

(51) Int. Cl.
| | |
|---|---|
| *B05D 7/06* | (2006.01) |
| *C09D 127/06* | (2006.01) |
| *C09D 133/06* | (2006.01) |
| *C09D 161/24* | (2006.01) |
| *B01F 15/00* | (2006.01) |
| *C09D 167/06* | (2006.01) |
| *C09D 5/34* | (2006.01) |
| *C09D 7/80* | (2018.01) |

(52) U.S. Cl.
CPC .......... *B05D 7/06* (2013.01); *B01F 15/00188* (2013.01); *B01F 15/00422* (2013.01); *C09D 5/34* (2013.01); *C09D 7/80* (2018.01); *C09D 127/06* (2013.01); *C09D 133/06* (2013.01); *C09D 161/24* (2013.01); *C09D 167/06* (2013.01); *B01F 2215/005* (2013.01)

(58) Field of Classification Search
None
See application file for complete search history.

(56) References Cited

U.S. PATENT DOCUMENTS

| | | | |
|---|---|---|---|
| 6,448,326 B1 | 9/2002 | Mayer et al. | |
| 6,451,896 B1 * | 9/2002 | Wandelmaier | C09D 7/80 524/445 |
| 2010/0285311 A1 | 11/2010 | Steidl et al. | |

FOREIGN PATENT DOCUMENTS

| | | |
|---|---|---|
| DE | 713 589 C | 11/1941 |
| DE | 197 05 219 A1 | 8/1998 |
| DE | 198 38 262 A1 | 2/2000 |
| DE | 199 42 515 A1 | 3/2001 |
| DE | 102 25 979 A1 | 12/2003 |
| DE | 10 2006 015 774 A1 | 10/2007 |
| EP | 0 744 447 A2 | 11/1996 |
| EP | 2 597 122 A1 | 5/2013 |
| FR | 1 127 830 A | 12/1956 |
| FR | 2 273 852 A1 | 1/1976 |
| JP | 6-502675 A | 3/1994 |
| JP | 9-504335 A | 4/1997 |
| JP | 2003-93967 A | 4/2003 |
| JP | 2008-63777 A | 3/2008 |
| WO | 92/17554 A1 | 10/1992 |
| WO | 01/18129 A1 | 3/2001 |

OTHER PUBLICATIONS

International Search Report dated Jan. 22, 2015 for PCT/EP2014/074874 filed on Nov. 18, 2014.

* cited by examiner

*Primary Examiner* — Shamim Ahmed
*Assistant Examiner* — Bradford M Gates
(74) *Attorney, Agent, or Firm* — Oblon, McClelland, Maier & Neustadt, L.L.P.

(57) ABSTRACT

A mixer system for producing topcoat compositions and filling compounds which has a volumetric or gravimetric metering plant as a mixing apparatus and at least the following components (a) to (d): at least one pigment-free component (a) for producing at least one topcoat composition (A); at least one component (b) different from (a), for producing at least one coating composition (B) used as a filling compound; a plurality of different pigment pastes (c) different from the components (a), (b), and (d), which in each case independently of one another include at least one binder (c1), at least one organic solvent (c2), and at least one pigment (c3); and a plurality of different, binder-free dye solutions (d). A process for producing topcoat compositions and/or filling compounds with the mixer system, and a method of repairing defects on or in wood with the topcoat compositions and/or filling compounds.

15 Claims, No Drawings

MIXER SYSTEM FOR PRODUCING TOPCOAT COMPOSITIONS AND COATING COMPOSITIONS USED AS FILLER

The present invention relates to a mixer system for producing topcoat compositions and filling compounds comprising a volumetric or gravimetric metering plant as a mixing apparatus and comprising at least the following components (a) to (d): at least one pigment-free component (a) for producing at least one topcoat composition (A), where (a) comprises at least one binder (a1) and at least one organic solvent (a2), at least one component (b), different from (a), for producing at least one coating composition (B) used as filling compound, where (b) comprises at least one binder (b1), which comprises at least one unsaturated polyester and/or at least one polyurethane, at least one organic solvent (b2), and at least one filler (b3), a plurality of different pigment pastes (c), which each independently of one another comprise at least one binder (c1), at least one organic solvent (c2), and at least one pigment (c3), and a plurality of different, binder-free dye solutions (d), which each independently of one another comprise at least one organic solvent (d1) and at least one dye (d2), to a use of this mixer system for producing topcoat compositions and/or filling compounds, to a process for producing topcoat compositions and/or filling compounds using the mixer system, and to a use of the topcoat compositions and/or filler compounds obtainable accordingly for repairing defects on or in wood.

Customary methods for repairing damage sites on an optionally multicoat finish on metallic components, more particularly in automotive refinish, include the steps of careful cleaning, of sanding, and of filling and/or surfacing at the damage site. Thereafter the damage site, optionally after a further pretreatment, is usually treated with suitable coating materials, applied hidingly and running out into the adjacent regions, such as with suitable basecoat materials, for example. After the coating produced in this way has undergone partial drying, the coating and the adjacent portions are typically oversprayed with a clearcoat, and then dried together with the coats applied previously.

The method for repairing damage sites which are located on or in uncoated or coated wood surfaces often differ from the above-described method for repairing damage sites on an optionally multicoat finish on metallic components, in that the damage site in question, where necessary, is first of all filled and the damage site thus treated is subsequently coated directly with at least one topcoat composition employed as a retouch paint. This is the way, for example, in which damage sites on wooden pieces, wooden articles or wooden components are repaired that are used for producing dashboards in the automobile segment. The masking of visible edges on components, moreover, necessitates covering with an edge paint. For this purpose too it is usual to use a topcoat composition. An edge paint of this kind is used, for example, to cover milled edges or butt edges.

In the context of such repair to damage sites it is important that the filling compounds or topcoat compositions used for the repair have the same or at least approximately the same shades of color as the uncoated or coated wood surface for repair per se, so that after the repair it is not possible to detect that a repair has in fact taken place.

The corresponding coating compositions employed as filling compounds or as topcoat compositions may be supplied directly in the desired shade from the paint manufacturer. A disadvantage of this, however, is that often only small amounts of them are needed for the repair, but the completed filling compounds or topcoat compositions are often not stable on storage at least over a long period such as a period of more than 12 months, for example. For economic reasons, therefore, such a procedure is disadvantageous.

A further possibility, based on a base mixture, is for the manufacturer to add different tinting correctives in order to prepare the filling compounds or topcoat compositions at least approximately in the shades required for the repair, and to supply these corrected formulations to the customers. Subsequently, on site, a third mixture is added to these mixtures prior to the repair, in order to generate a resultant mixture having at least approximately the exact desired shade for each individual wood to be repaired, as required for the specific refinish coating. A disadvantage of this, however, is that the components of the third mixture are often not matched to the components of the base mixture and/or of the tinting corrective, in terms, for example, of the binder components they each contain, and accordingly there may be problems, for example, of phase separation, color stabilities and/or metamerism effects. Also it is often possible to achieve only a low level of reproducibility of the respective resulting mixture.

Mixer systems comprising only different pigment pastes are known, for example, from DE 198 38 262 A1 and DE 197 05 219 A1. DE 10 2006 015 774 A1, DE 102 25 979 A1, FR 1 127 830 A, DE 713 589 C, EP 0 744 447 A2, and FR 2 273 852 A disclose various coating materials but no mixer systems.

Mixer systems for producing aqueous basecoat compositions are also known from WO 92/17554 A1 and WO 01/18129 A1. These mixer systems allow the production of compositions with precisely defined shade coloring from a variety of base paints. This production from a mixer system has the fundamental advantage that it is not necessary for each individual shade to be produced and stored, thereby allowing reductions in production, distribution, and warehousing costs.

The mixer systems described in WO 92/17554 A1 and WO 01/18129 A1 are suitable, however, only for producing aqueous basecoat compositions which are employed in the refinishing of metallic components in the automobile industry. In order to repair wood or wooden objects, as set out above, not only at least one topcoat composition but also a filling compound is required. Such compositions are typically solvent-based. Owing to the fillers they contain, moreover, such filling compounds are typically notable for a comparatively high viscosity, especially relative to a topcoat composition.

Since the use of such filling compounds is vital, however, for the repair of defects on or in wood, there is a need, accordingly, for a mixer system by means of which both topcoat compositions and also coating compositions used as filling compounds can be produced, in each case with a high shade accuracy, that are suitable for the refinishing of wood or wooden objects and with which the disadvantages stated above can be avoided.

It is an object of the present invention, therefore, to provide a mixer system by means of which not only topcoat compositions but also coating compositions used as filling compounds can be produced, in each case with a high shade accuracy, that are suitable for the refinishing of wood or wooden objects, in order thus to allow the desired shades to be set with great precision and reproducibility on site directly prior to their application.

This object is achieved by the subject matter claimed in the claims and also by the preferred embodiments of said subject matter that are described in the description hereinafter.

The present invention accordingly first provides a mixer system for producing topcoat compositions and filling compounds comprising a volumetric or gravimetric metering plant as a mixing apparatus and comprising at least the following components (a) to (d) and also optionally (e), these being (a) at least one pigment-free component (a) for producing at least one topcoat composition (A), where (a)

comprises at least one binder (a1), at least one organic solvent (a2), and optionally at least one matting agent (a3), (b) at least one component (b), different from (a), preferably pigment-free, for producing at least one coating composition (B) used as filling compound, where (b)

comprises at least one binder (b1), at least one organic solvent (b2), and at least one filler (b3), where the binder (b1) comprises at least one unsaturated polyester and/or at least one polyurethane, (c) a plurality of different pigment pastes different from the components (a), (b), (d), and optionally (e) which in each case independently of one another comprise at least one binder (c1), at least one organic solvent (c2), and at least one pigment (c3), (d) a plurality of different, binder-free dye solutions, which each independently of one another comprise at least one organic solvent (d1) and at least one dye (d2), and (e) optionally one or more different organic solvents, which may optionally comprise at least one additive and/or at least one crosslinking agent.

The present invention secondly provides a mixer system for producing topcoat compositions and filling compounds, comprising at least the following components (a) to (d) and also optionally (e), these being (a) at least one pigment-free base composition for producing at least one topcoat composition (A), where (a)

comprises at least one binder (a1), at least one organic solvent (a2), and optionally at least one matting agent (a3), (b) at least one base composition, different from (a), preferably pigment-free, for producing at least one coating composition (B) used as filling compound, where (b)

comprises at least one binder (b1), at least one organic solvent (b2), and at least one filler (b3), (c) a plurality of different pigment pastes, which in each case independently of one another comprise at least one binder (c1), at least one organic solvent (c2), and at least one pigment (c3), (d) a plurality of different, binder-free dye solutions, which each independently of one another comprise at least one organic solvent (d1) and at least one dye (d2), and (e) optionally one or more different organic solvents, which may optionally comprise at least one additive and/or at least one crosslinking agent.

The mixer system of the invention is optionally suitable, moreover, for producing colored clearcoat compositions, by mixing at least one component (a) with at least one component (d), for example.

It has surprisingly been found that the mixer system of the invention makes it possible to be able to produce not only topcoat compositions, more particularly topcoat compositions used as retouch paint and/or edge paint, but also coating compositions used as filling compounds, by means of just one paste technology from a limited number of base components present in the mixer system, in each case with a high shade accuracy, even each in only small quantities, that are suitable more particularly for the refinishing of wood or wooden articles. The mixer system of the invention permits precise and reproducible setting of the respective desired shades immediately prior to their application.

In particular it has been found, surprisingly, that by means of the mixer system of the invention it is possible to obtain not only the required topcoat compositions, more particularly topcoat compositions used as retouch paint and/or edge paint, but also the required filling compound from a single line, i.e., from only one paste series, which typically differs from the topcoat compositions in terms of its solids content and/or its viscosity, for example.

The mixer system of the invention also means that it is necessary to store only a small amount of different base components on site (space saving). There is, additionally, no need to change the composition of the respective base components for use in the mixer system. Furthermore, flexible adaptation to the particular wood to be treated is possible. Moreover, the mixer system of the invention has advantages on economic grounds, since the base materials per se typically have a higher storage stability than the topcoat compositions and/or filling compounds produced from them.

The mixer system of the invention, moreover, allows simple and cost-effective final production of high-quality, ready-to-use topcoat compositions and filling compounds in a large number of precisely reproducible shades, with high quality, by the user directly at the site of use, and is suitable for use in the "do-it-yourself" segment.

The mixer system of the invention is suitable for producing topcoat compositions and filling compounds and also clearcoat compositions.

The term "comprising" or "containing" in the sense of the present invention, as for example in connection with each of components (a), (b), (c), (d) and (A), (A1), (A2) and (B), in one preferred embodiment has the meaning "consisting of". In that case it is possible, for each of the aforementioned products in this preferred embodiment, for one or more of the further constituents present optionally and identified below to be present in each case independently of one another. All constituents may in each case be present in their preferred embodiments as identified above and below.

The synonymous terms "filling compound" and "putty" are known to the skilled person from, for example, DIN 55945 (date: October 2001). In the sense of the present invention, a "filling compound" is preferably a preferably pigmented coating composition notable for a high level of fillers therein, based on the total weight of the coating composition. This coating composition is preferably pasty and/or viscous. The coating composition used as filling compound is used on a suitable substrate surface, more particularly on a wood surface, for compensating unevennesses in the substrate that are too extensive for correction, for example, by application of a surfacer coat. A filling compound in the sense of the present invention is preferably drawable, spreadable and/or sprayable. The term "filling compound" encompasses preferably fine filling compounds, filling and drawing compounds, and synthetic-resin filling compounds. These terms as well are known to the skilled person and are defined for example in Römpp Lexikon, Lacke and Druckfarben, Georg Thieme Verlag 1998.

The topcoat compositions producible by means of the mixer system of the invention are more particularly topcoat compositions that can be used as retouch paint and/or as edge paint. These terms are known to the skilled person. "Retouch paint" in the sense of the present invention is preferably a pigment- and binder-containing, preferably translucent topcoat composition which is employed for repairing defects on or in wood. "Edge paint" in the sense of the present invention is preferably a pigment- and binder-containing topcoat composition which preferably also comprises at least one matting agent and which is used to mask visible edges, more particularly milled edges and/or butt edges. Edge paints may optionally also be employed as retouch paints. Retouch paints preferably do not include a matting agent.

Topcoat compositions produced by means of the mixer system of the invention and/or by means of the process of the invention below, and employable as retouch paint and/or as edge paint, typically have a solids content in the range from 5 to 45 wt %, more preferably in the range from 7.5 to 35 wt %, very preferably of 10 to 30 wt %, even more preferably in the range from 12.5 to 25 wt % or in the range from 15 to 30 wt % or in the range from 15 to 25 wt %, based in each case on the total weight of the topcoat composition (A). Methods for determining the solids content are known to the skilled person. The solids content is preferably determined in accordance with DIN EN ISO 3251 (date: Jun. 1, 2008), more particularly over a time of 120 minutes at 80° C.

Coating compositions produced by means of the mixer system of the invention and/or by means of the process of the invention below, and employed as filling compounds, typically have a solids content in the range from 15 to 85 wt %, more preferably in the range from 20 to 80 wt %, very preferably of 25 to 75 wt %, even more preferably in the range from 30 to 70 wt % or in the range from 35 to 65 wt % or in the range from 40 to 60 wt %, based in each case on the total weight of the coating composition (B). Methods for determining the solids content are known to the skilled person. The solids content is preferably determined in accordance with DIN EN ISO 3251 (date: Jun. 1, 2008), more particularly over a time of 120 minutes at 80° C.

The mixer system of the invention comprises at least four components (a), (b), (c), and (d), and also, optionally, (e). Each of components (a), (b), and (c), and also the topcoat composition (A) and the coating composition (B), independently of one another, is preferably a dispersion based on at least one organic solvent.

The components (a), (b), (c), and (d) present in the mixer system of the invention, and the optionally present component (e), are preferably, each independently of one another, nonaqueous components. Similar comments also apply, correspondingly, to the coating compositions employable as filling compounds and produced by means of the mixer system of the invention and/or by means of the process of the invention below, and to the corresponding topcoat compositions employable as retouch paint and/or as edge paint.

The term "nonaqueous" in connection with the components present in the mixer system of the invention and/or with the filling compounds and topcoat compositions that are obtainable refers preferably to those liquid products which—as liquid diluent, i.e., as liquid solvent and/or dispersion medium—comprise organic solvents as principal component. Optionally, however, products may include water in small proportions. The proportion of water in the respective products is preferably not more than 10.0 wt %, more preferably not more than 9.0 wt %, very preferably not more than 8.0 wt %, more particularly not more than 5.0 wt % or not more than 4.0 wt % or not more than 3.0 wt %, more preferably still not more than 2.5 wt % or not more than 2.0 wt % or not more than 1.5 wt %, most preferably not more than 1.0 wt % or not more than 0.5 wt % or not more than 0.1 wt %, based in each case on the total fraction of the liquid diluents—i.e., liquid solvents and/or dispersion media—present in products. The respective products more particularly contain no fractions of water.

The fractions in wt % of all the components present in turn in the components (a) to (d) and optionally (e) used in accordance with the invention—such as, for example, of (a1) and (a2) in the case of component (a)—and and also the fractions in wt % of all components (b) to (d) and optionally (e) in the coating compositions (B) employable as filling compounds, or of all components (a), (c), (d), and optionally (e) in the topcoat compositions (A), add up preferably in each case to 100 wt %, based on the respective total weight.

Binders and Solvents

The term "binders" is understood for the purposes of the present invention and in agreement with DIN EN ISO 4618 (German version, date: March 2007) to refer preferably to the nonvolatile fractions of a coating composition that are responsible for film-forming—that is, for example, components (a), (b), and (c) and also the compositions (A) and (B). Pigments and/or fillers present therein are therefore not subsumed by the term "binder". The nonvolatile fraction can be determined in accordance with DIN EN ISO 3251 (date: Jun. 1, 2008). More particularly, the term "binder" refers to the resins, more particularly polymeric resins, that are present in the respective coating materials and are responsible for film-forming. Preferably also embraced by the term "binder" are any crosslinking agents present in the respective coating material. The crosslinking agent, where present, may be located in each case in component (a), (b), (c) and/or (d) and/or (e). It is preferably located in component (e).

All binders that are customary and are known to the skilled person are suitable here as binder component (a1) of the inventively employed component (a) and/or as binder component (b1) of the inventively employed component (b) and/or as binder component (c1) of the inventively employed component (c).

Preferably each of binders (1), (b1), and (c1) comprises at least one polymeric resin which optionally has reactive functional groups that allow a crosslinking reaction. The respective binder is a self-crosslinking binder or an externally crosslinking binder, preferably a self-crosslinking binder. To allow a crosslinking reaction, therefore, the binder (a1), (b1), or (c1) of the respective component (a), (b), or (c) may in each case independently of one another, as well as the at least one polymeric resin, comprise—optionally—at least one crosslinking agent.

The polymeric resin present in the respective binder (1), (b1), or (c1) of the respective component (a), (b), or (c), or the crosslinking agent optionally present additionally in each case, is preferably thermally crosslinkable, by means of physical drying, for example, and is crosslinkable preferably on heating to oven temperatures at or above 18-23° C.

In this context, any customary crosslinkable reactive functional group known to the skilled person is contemplated. Each of the polymeric resins of the binders (1), (b1), or (c1) of the respective component (a), (b), or (c) preferably has at least one kind of functional reactive groups selected from the group consisting of primary amino groups, secondary amino groups, hydroxyl groups, thiol groups, carboxyl groups, groups with at least one C=C double bond, such as vinyl groups or (meth)acrylate groups, for example, and epoxide groups, and also mixtures thereof. Preferred are hydroxyl groups, carboxyl groups and/or epoxide groups, more particularly hydroxyl groups.

Suitable in principle as a polymeric resin component that can be used within the binder (a1), (b1) and/or (c1) are all customary suitable polymeric resins known to the skilled person, optionally having reactive functional groups, more particularly those polymeric resins which are present together with (a2) or (b2) or (c2), respectively, in the form of a solution or dispersion. Possible polymeric resins of the binder (1), (b1), and (c1), which may be used in each case independently of one another, are polymeric resins selected from the group consisting of polyurethanes, polyureas, saturated polyesters, unsaturated polyesters, polyamides, poly(meth)acrylates, (meth)acrylic copolymers, polyvinyl chlorides, vinyl chloride copolymers, polystyrenes, styrene copolymers, olefin homopolymers and copolymers, epoxy resins, and mixtures thereof.

All customary crosslinking agents known to the skilled person may be used, such as, for example, phenolic resins, polyfunctional Mannich bases, melamine resins, benzoguanamine resins, epoxides, free polyisocyanates and/or blocked polyisocyanates more particularly blocked polyisocyanates. A particularly preferred crosslinking agent is a blocked polyisocyanate. Blocked polyisocyanates which may be utilized include any polyisocyanates such as diisocyanates, for example, in which the isocyanate groups have been reacted with a compound, so that the blocked polyisocyanate formed is stable in particular with respect to hydroxyl groups and amino groups such as primary and/or secondary amino groups at room temperature, i.e., at a temperature from 18 to 23° C., but reacts at elevated temperatures, as for example at ≥40° C. or 60° C. or 80° C., more preferably ≥110° C., very preferably ≥130° C., and especially preferably ≥140° C., or at 90° C. to 300° C. or at 100 to 250° C., more preferably at 125 to 250° C., and very preferably at 150 to 250°.

The relative weight ratio of the at least one polymeric resin of the respective binder (a1), (b1), or (c1) and of the respective optionally present at least one crosslinking agent in the respective component (a), (b), or (c) to one another is preferably in a range from 4:1 to 1.1:1, more preferably in a range from 3:1 to 1.1:1, very preferably in a range from 2.5:1 to 1.1:1, more particularly in a range from 2.1:1 to 1.1:1, based in each case on the solids content of the at least one polymeric resin and of the at least one crosslinking agent in the respective component (a), (b), or (c).

All customary organic solvents known to the skilled person are suitable as a solvent component (a2) of the inventively employed component (a) or as a solvent component (c2) of the inventively employed component (c) or as a solvent component (d1) of the inventively employed component (d) and/or solvent component of the optionally inventively employed component (e). The term "organic solvent" is known to the skilled person, in particular from council Directive 1999/13/EC dated 11 March 1999 (referred to therein as solvent).

Each of the organic solvents (a2), (c2), (d1), and (e), in each case independently of one another, is preferably selected from the group consisting of monohydric or polyhydric alcohols, examples being methanol, ethanol, 1-propanol, 2-propanol, 1-butanol, ethylene glycol, ethyl glycol, propyl glycol, butyl glycol, butyl diglycol, 1,2-propanediol and/or 1,3-propanediol, ethers, as for example diethylene glycol dimethyl ether, aliphatic hydrocarbons, aromatic hydrocarbons, as for example toluene and/or xylenes, ketones, as for example acetone, N-methylpyrrolidone, N-ethylpyrrolidone, methyl isobutyl ketone, isophorone, cyclohexanone, methyl ethyl ketone, esters, as for example methoxypropyl acetate, ethyl acetate and/or butyl acetate, amides, as for example dimethylformamide, and mixtures thereof.

Each of components (a), (b), (c), (d), and optionally (e), more particularly (d) and/or (e), may in each case independently of one another have at least one further additive. This at least one additive is preferably selected from the group consisting of antioxidants, antistats, wetting agents, dispersants, antisettling agents, emulsifiers, flow control assistants, solubilizers, defoamers, wetter agents, stabilizers, preferably heat stabilizers, process stabilizers, and UV and/or light stabilizers, photoprotectants, deaerating agents, inhibitors, catalysts, waxes, flexibilizers, flame retardants, water repellants, hydrophilizing agents, thixotropic agents, impact modifiers, expandants, process assistants, plasticizers, and mixtures of the aforementioned additives. The amount of additive in the respective component may vary widely according to the intended use. Based on the total weight of the respective component, the amount is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %.

Component (a)

The mixer system of the invention comprises at least one component (a).

Component (a) of the mixer system of the invention is a pigment-free base composition for producing at least one topcoat composition (A), and (a) comprises at least one binder (a1) and at least one organic solvent (a2).

Component (a) may optionally further comprise at least one matting agent (a3).

The at least one component (a) is preferably transparent. The at least one component (a) is preferably color-neutral, i.e., colorless.

The mixer system of the invention preferably comprises at least two different components (a) (viz. (a-I) and (a-II))), these being at least one component (a-I) for producing at least one topcoat composition (A1), where (a-I) comprises at least one binder (a1) and at least one organic solvent (a2), and at least one component (a-II) for producing at least one topcoat composition (A2) different from (A1), where (a-II) comprises at least one binder (a1), at least one organic solvent (a2), and at least one matting agent (a3).

Component (a-I) is preferably transparent and optionally glossy. Preferably (a-I) contains no matting agent. The at least one topcoat composition (A1) obtainable from component (a-I) is used preferably as a retouch paint, more particularly for repairing defects on or in wood, preferably after filling of the defects with a coating composition used as a filling compound, such as the coating composition (B). Component (a-II) is preferably transparent and, in view of the presence of the matting agent (a3), is matt or has a reduced gloss by comparison, for example, with component (a-I). The topcoat composition (A2) obtainable at least from component (a-II) is used preferably as an edge paint, more particularly for repairing defects on or in wood, preferably after filling of the defects with a coating composition used as a filling compound, such as the coating composition (B).

The at least one binder (a1) present in the at least one component (a) preferably comprises at least one polymeric resin having at least functional hydroxyl groups. The binder (a1) preferably contains no crosslinking agent—that is, the binder (a1) is a self-crosslinking binder. If, however, an externally crosslinking binder is employed as binder (a1), it preferably comprises at least one blocked isocyanate as crosslinking agent.

With particular preference, the at least one binder (1) present in the at least one component (a) comprises at least one polymeric resin having at least functional hydroxyl groups and/or carboxyl groups and/or epoxide groups, more particularly at least hydroxyl groups, said resin being a copolymer of vinyl chloride and at least one other ethylenically unsaturated compound. Especially suitable ethylenically unsaturated compounds are compounds which have at least one reactive functional group selected from the group consisting of vinyl groups and (meth)acrylic groups, i.e., methacrylic and/or acrylic groups. Particularly preferred ethylenically unsaturated compounds are selected from the group consisting of vinyl acetate, (meth)acrylic esters, more particularly $C_{1-8}$ alkyl (meth)acrylic esters, and (meth) acrylic acid. The fraction of reacted vinyl chloride within the copolymer is preferably in the range of 50-95 wt %, and the fraction of the reacted at least one other ethylenically unsaturated compound is preferably in the range of 5-50 wt %, based in each case on the total weight of the copolymer. Corresponding products are available commercially and are sold, for example, under the name Vinnol® from Wacker or under the name UCAR® from Dow.

The at least one binder (a1) may optionally, additionally or alternatively, comprise at least one (further) polymeric resin component, more particularly at least one poly(meth) acrylate having at least functional hydroxyl groups and/or carboxyl groups and/or epoxide groups.

The at least one binder (a1) may optionally, additionally or alternatively, comprise at least one (further) polymeric resin component, more particularly at least one polyurethane-polyacrylate hybrid polymer optionally having at least functional hydroxyl groups and/or carboxyl groups and/or epoxide groups. Corresponding products are available commercially and are sold, for example, under the name Hybridur® from Air Products, as for example Hybridur® 570 and Hybridur® 870.

A suitable matting agent (a3) is any customary matting agent known to the skilled person. The matting agent (a3) is preferably selected from the group consisting of silicas, more particularly natural and synthetic silicas such as fumed silicas, amorphous and thermal silicas, silicates, and polymeric matting agents, more particularly polyamides and urea-formaldehyde polymers. The matting agent (a3) is not counted in the binder content (1). Particularly preferred matting agents (a3) are silicas and/or silicates. Corresponding products are available commercially and are sold, for example, under the name Syloid® from Grace, as for example Syloid ED 30, or under the name Acematt® from Evonik, such as Acematt® TS100 and Acematt® OK412, for example.

Component (a) preferably comprises
at least one binder (a1) in an amount such that the solids content of the at least one binder (a1) is in the range from 5 to 20 wt %, more preferably from 7.5 to 15 wt %, based on the total weight of (a),
at least one organic solvent (a2) in an amount in a range from 50 to 95 wt %, more preferably from 60 to 90 wt %, based on the total weight of (a),
optionally at least one matting agent (a3) in an amount such that the solids content of the at least one matting agent (a3) is in the range from 0 to 10 wt %, more preferably from 0 to 6 wt %, based on the total weight of (a),
the constituents of component (a) adding up in total to 100 wt %.

Component (a-I) more preferably comprises
at least one binder (a1) in an amount such that the solids content of the at least one binder (a1) is in the range from 5 to 20 wt %, more preferably from 7.5 to 15 wt %, based on the total weight of (a-I), and
at least one organic solvent (a2) in an amount in a range from 50 to 95 wt %, more preferably from 80 to 95 wt %, based on the total weight of (a-I),
the constituents of component (a-I) adding up in total to 100 wt %.

Component (a-II) more preferably comprises
at least one binder (a1) in an amount such that the solids content of the at least one binder (a1) is in the range from 5 to 20 wt %, more preferably from 7.5 to 15 wt %, based on the total weight of (a-II),
at least one organic solvent (a2) in an amount in a range from 50 to 95 wt %, more preferably from 60 to 90 wt %, based on the total weight of (a-II), and
optionally at least one matting agent (a3) in an amount such that the solids content of the at least one matting agent (a3) is in the range from 0 to 10 wt %, more preferably from 0 to 6 wt %, based on the total weight of (a-II),
the constituents of component (a-II) adding up in total to 100 wt %.

Component (b)

The mixer system of the invention comprises at least one component (b).

Component (b) of the mixer system of the invention is a preferably pigment-free base composition, different from (a), for producing at least one coating composition (B) used as a filling compound, with (b) comprising at least one binder (b1), at least one organic solvent (b2), and at least one filler (b3).

The at least one component (b) is preferably color-neutral, i.e., colorless.

The at least one binder (b1) present in the at least one component (b) preferably comprises at least one unsaturated polyester as polymeric resin component, more particularly if the at least one organic solvent (b2) likewise present therein is a reactive diluent. The at least one binder (b1) may optionally, additionally or alternatively, comprise at least one polyurethane as polymeric resin component.

The preparation of unsaturated polyesters of this kind is known to the skilled person. Especially suitable as unsaturated polyesters are those polyesters which derive from polyols, more particularly diols and/or triols such as, for example, ethylene glycol, 1,2-propylene glycol, 1,3-propylene glycol, 1,4-butanediol, diethylene glycol, dipropylene glycol and/or neopentyl glycol and from at least monounsaturated polycarboxylic acids such as corresponding at least monounsaturated tricarboxylic and/or dicarboxylic acids, examples being maleic acid, maleic anhydride, fumaric acid, itaconic acid, mesaconic acid and/or citric acid, and also in each case from suitable derivatives thereof such as esters or anhydrides, for example. To prepare the unsaturated polyesters it is possible additionally, moreover, to use saturated polycarboxylic acids, more particularly saturated dicarboxylic acids such as adipic acid, ortho-phthalic acid, phthalic acid (anhydride), tetrahydrophthalic acid (anhydride) and/or isophthalic acid, and/or optionally, suitable, preferably saturated, monocarboxylic acids, particularly if triols are employed as a polyol component, and/or saturated monoalcohols. Unsaturated polyesters of this kind may be cured and/or crosslinked by means of compounds which permit radical polymerization as a curing reaction initiated, for example, by the decomposition of organic peroxides. The decomposition of the peroxides takes place via temperature influence and/or via the presence of accelerators such as metallic salts, an example being cobalt octoate. Since this is a radical polymerization, there is no need for stoichiometric configuration of the unsaturated polyesters and the crosslinking agent to be used—in other words, the latter can be used in only small, preferably catalytic amounts. Suitable products available commercially are, for example, Roskydal® products from Bayer, Ludopal® products from BASF, and Synolite® products from DSM.

Where the binder (b1) additionally or alternatively comprises at least one polyurethane as polymeric resin, those more particularly suitable are polyurethane-based resins which are formed by a polyaddition reaction between hydroxyl-containing compounds such as polyols (such as, for example, hydroxyl groups of polyesters or hydroxyl-containing polyethers and also mixtures thereof) and at least one polyisocyanate (aromatic and aliphatic isocyanates or di- and polyisocyanates). In this case, normally, a stoichiometric conversion of the OH groups of the polyols with the NCO groups of the polyisocyanates is required. The stoichiometric ratio to be used may, however, also be varied, since the polyisocyanate may be added to the polyol component in amounts such that there may be an "overcrosslinking" or an "undercrosslinking".

Employed as organic solvent (b2) is preferably at least one reactive diluent. All customary reactive diluents may be employed as (b2). The reactive diluent employed preferably comprises at least one ethylenically unsaturated double bond. The reactive diluent is preferably selected from the group consisting of compounds which have at least one functional group selected from the group consisting of vinyl groups, allyl groups, and (meth)acrylic groups. The reactive diluents may be mono-, di-, or polyunsaturated. Examples of monounsaturated reactive diluents are (meth)acrylic acid and the esters thereof, maleic acid and its monoesters, vinyl acetate, vinyl ethers, substituted vinylureas, styrene, and vinyltoluene. Examples of diunsaturated reactive diluents are di(meth)acrylates such as alkylene glycol di(meth)acrylate, polyethylene glycol di(meth)acrylate, 1,3-butanediol di(meth)acrylate, vinyl (meth)acrylate, allyl (meth)acrylate, divinylbenzene, dipropylene glycol di(meth)acrylate, and hexanediol di(meth)acrylate. Examples of polyunsaturated reactive diluents are glycerol tri(meth)acrylate, trimethylolpropane tri(meth)acrylate, pentaerythritol tri(meth)acrylate, and pentaerythritol tetra(meth)acrylate. The reactive diluents may be used individually or in a mixture. Reactive diluents employed with preference are compounds having at least one vinyl group, more particularly styrene.

Component (b) may optionally—if (b2) is a reactive diluent—further comprise at least one further organic solvent. Suitable for this purpose are all organic solvents which may also be employed as (a2) within component (a).

Where component (b) comprises a polyurethane as polymeric resin of the binder (b1), (b2) is preferably not a reactive diluent such as styrene, but instead is at least one organic solvent, especially when the binder contains no unsaturated polyester. Suitable for this purpose are all organic solvents which may also be employed as (a2) within component (a).

Component (b) preferably comprises a filler (b3).

The term "filler" is known to the skilled person from, for example, DIN 55943 (date: October 2001). A "filler" in the sense of the present invention means preferably a substance which is substantially insoluble in the application medium, such as a coating composition (B) and/or component (b), for example, and which is used in particular for increasing the volume. "Fillers" in the sense of the present invention preferably differ from "pigments" in their refractive index, which for fillers is <1.7.

Any customary filler known to the skilled person may be used as component (b3). Examples of suitable fillers are kaolin, dolomite, calcite, chalk, calcium sulfate, barium sulfate, graphite, silicates such as magnesium silicates, more particularly corresponding phyllo-silicates such as hectorite, bentonite, montmorillonite, talc and/or mica, silicas, more particularly fumed silicas, hydroxides such as aluminum hydroxide or magnesium hydroxide, or organic fillers such as textile fibers, cellulose fibers, polyethylene fibers, or polymer powders; for further details, refer to Rompp Lexikon Lacke and Druckfarben, Georg Thieme Verlag, 1998, pages 250 ff., "Fillers".

Component (b) is preferably pigment-free, but may alternatively optionally comprise at least one pigment. Suitable pigments are all pigments which may also be employed as constituent (c3) of component (c), such as titanium dioxide, for example. Any pigment present may be used in the same amounts as the filler (b3). Preferably, however, component (b) is pigment-free.

Component (b) preferably comprises at least one binder (b1) in an amount such that the solids content of the at least one binder (b1) is in the range from 40 to 90 wt %, more preferably from 45 to 80 wt %, based on the total weight of (b), at least one organic solvent (b2) in an amount in a range from 5 to 20 wt %, more preferably from 5 to 15 wt %, based on the total weight of (b), and at least one filler (b3) in an amount in a range from 15 to 40 wt %, more preferably from 20 to 35 wt %, based on the total weight of (b), the constituents of component (b) adding up in total to 100 wt %.

Component (c)

The mixer system of the invention comprises a plurality of different components (c), more particularly a number of different components (c) that is in a range from 2 to 25, preferably from 3 to 20 or from 4 to 15, or from 4 to 10.

The components (c) of the mixer system of the invention are a plurality of different pigment pastes which each independently of one another comprise at least one binder (c1), at least one organic solvent (c2), and at least one pigment (c3).

The plurality of pigment pastes (c) are different not only from component (a) but also from component (b) and from component (d) and optionally (e).

The polymeric resin present in (c1) is preferably at least one grinding resin. The at least one binder (c1) present in the at least one component (c) preferably comprises at least one polymeric condensation product of urea and/or formaldehyde and at least one preferably aliphatic—such as, for example, a $C_{1-10}$ aliphatic-aldehyde and/or at least one preferably (cyclo)aliphatic ketone, as for example cyclohexanone or methylcyclohexanone, as polymeric resin component. Such polymeric resins and their preparation are known from EP 2 597 122 A1, for example. The at least one binder (c1) present in the at least one component (c) more preferably comprises at least one polymeric condensation product of urea and at least one aliphatic aldehyde as polymeric resin component. Suitable products available commercially are Laropal® products from BASF, for example.

The term "pigment" is known to the skilled person from, for example, DIN 55943 (date: October 2001). A "pigment" in the sense of the present invention means preferably compounds in powder or platelet form which are substantially, preferably entirely, insoluble in the medium surrounding them, such as in component (c), the topcoat composition (A), including (A1) and/or (A2), or the coating composition (B), for example. These substances are preferably colorants and/or substances which can be used as pigment on account of their magnetic, electrical and/or electromagnetic properties. Pigments differ from "fillers" preferably in their refractive index, which for pigments is 1.7.

The pigment (c3) is preferably selected from the group consisting of inorganic and organic coloring pigments, effect pigments, and mixtures thereof.

Examples of suitable inorganic coloring pigments are white pigments such as zinc white, zinc sulfide, or lithopones; black pigments such as carbon black, iron manganese black or spinel black; chromatic pigments such as chromium oxide, chromium oxide hydrate green, cobalt green, or ultramarine green, cobalt blue, ultramarine blue, or manganese blue, ultramarine violet or cobalt violet and manganese violet, red iron oxide, cadmiumsulfoselenide, molybdate red, or ultramarine red; brown iron oxide, mixed brown, spinel phases and corundum phases, or chromium orange; or yellow iron oxide, nickel titanium yellow, chromium titanium yellow, cadmium sulfide, cadmium zinc sulfide, chromium yellow, or bismuth vanadate. Other inorganic coloring pigments are silicon dioxide, aluminum oxide, aluminum oxide hydrate, more particularly boehmite, titanium dioxide, zirconium oxide, cerium oxide, and mixtures thereof.

Examples of suitable organic coloring pigments are monoazo pigments, disazo pigments, anthraquinone pigments, benzimidazole pigments, quinacridone pigments, quinophthalone pigments, dike topyrrolopyrrol pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black.

A skilled person is familiar with the concept of effect pigments. More particularly, effect pigments are those pigments which impart optical effect or color and optical effect, more particularly optical effect. A corresponding subdivision of the pigments can be made in accordance with DIN 55944 (date: December 2011). The effect pigments are preferably selected from the group consisting of organic and inorganic optical effect and color and optical effect pigments. They are more preferably selected from the group consisting of organic and inorganic optical effect or color and optical effect pigments. More particularly the organic and inorganic optical effect and color and optical effect pigments are selected from the group consisting of uncoated or coated metallic effect pigments, of uncoated or coated metal oxide effect pigments, of effect pigments composed of uncoated or coated metals and nonmetals, and of uncoated or coated nonmetallic effect pigments. More particularly the uncoated or coated—silicate-coated, for example—metallic effect pigments are aluminum effect pigments, iron effect pigments, or copper effect pigments. Especially preferred are uncoated or coated—silicate-coated, for example—aluminum effect pigments, more particularly products available commercially from Eckart such as Stapa® Hydrolac, Stapa® Hydroxal, Stapa® Hydrolux and Stapa® Hydrolan, most preferably Stapa® Hydrolux and Stapa® Hydrolan. The effect pigments employed inventively, more particularly uncoated or coated—silicate-coated, for example—aluminum effect pigments, may be present in any customary form known to the skilled person, such as a leaflet and/or platelet form, more particularly a (corn)flake form or a silverdollar form. The effect pigments composed of metals and nonmetals are more particularly iron oxide-coated aluminum pigments in platelet form, as described in European patent application EP 0 562 329 A2, for example; glass flakes coated with metals, more particularly with aluminum; or interference pigments which contain a metal reflector layer, more particularly of aluminum, and have a strong color flop. The nonmetallic effect pigments are more particularly pearlescent pigments, especially mica pigments; platelet-shaped graphite pigments coated with metal oxides; interference pigments which contain no metal reflector layer and exhibit a strong color flop; platelet-shaped effect pigments based on iron oxide, with a shade from pink to brownish red; or organic liquid-crystalline effect pigments. For further details with regard to the effect pigments employed inventively, refer to Rompp Lexikon Lacke and Druckfarben, Georg Thieme Verlag, 1998, page 176, "Effect pigments" and pages 380 and 381, "Metal oxide-mica pigments" to "Metal pigments".

As component (c) it is possible to use products available commercially, such as Salcomix® products and Microlith® products from BASF, for example.

Component (c) preferably comprises at least one binder (c1) in an amount such that the solids content of the at least one binder (c1) is in the range from 5 to 40 wt %, more preferably from 10 to 35 wt %, based on the total weight of (c), at least one organic solvent (c2) in an amount in a range from 30 to 90 wt %, more preferably from 35 to 75 wt % or from 35 to 65 wt %, based on the total weight of (c), and at least one pigment (c3) in an amount in a range from 5 to 40 wt %, more preferably from 5 to 35 wt %, based on the total weight of (c), the constituents of component (c) adding up in total to 100 wt %.

Component (d)

The mixer system of the invention comprises a plurality of different components (d), more particularly a number of different components (d) that is in a range from 2 to 25, preferably from 3 to 20 or from 4 to 15, or from 5 to 12.

The components (d) of the mixer system of the invention are a plurality of different, binder-free dye solutions, which each independently of one another comprise at least one organic solvent (d1) and at least one dye (d2).

The at least one dye (d2) present in component (d) is preferably selected from the group consisting of acid dyes (anionic dyes), basic dyes (cationic dyes), fat-soluble dyes, and metal complex dyes, and also mixtures thereof. The at least one dye (d2) present in component (d) is selected more particularly from the group consisting of basic dyes (cationic dyes), fat-soluble dyes, and metal complex dyes, and also mixtures thereof.

The term "dye" is known to the skilled person from, for example, DIN 55943 (date: October 2001). A "dye" in the sense of the present invention means preferably a compound which is entirely soluble in the medium surrounding it, such as in component (d), for example. The solubility here is determined in accordance with DIN EN ISO 7579 (date: March 2010). The optical effect of a dye is based on nonselective light absorption.

Examples of basic dyes are, in particular, dyes which have at least one deprotonatable carboxylic acid group and/or sulfonic acid group. Basic dyes are soluble more particularly in polar solvents such as acetone, alcohols and/or glycols. Basic dyes have at least one positive charge within the molecule. Examples of acid dyes are, in particular, dyes which have at least one carboxylic acid and/or sulfonic acid group. Examples of fat-soluble dyes are nonionic azo dyes and anthraquinone dyes; fat-soluble dyes are soluble in particular in aromatic and aliphatic hydrocarbons as solvents. Metal complex dyes are preferably anionic chromium and/or cobalt and/or copper and/or nickel complexes of azo dyes or optionally substituted phthalocyanines. Metal complex dyes are soluble in particular in alcohols, glycols, ketones and/or esters. Suitable dyes which can be used as dye (d2) are available commercially, as for example under the names Irgasperse® from BASF such as Irgasperse® Brown 4R-U2, Irgasperse® Red and Irgasperse® Yellow, for example, Neozapon® from BASF such as, for example, Neozapon® Green 975 and Neozapon® Red 395, or Orasol® from BASF, such as Orasol® Yellow and Orasol® Red, for example.

Suitable preferred solvents (d1) are in particular at least one solvent selected from the group consisting of butyl acetate, isopropanol, ethyl acetate, ethanol, and methoxypropyl acetate.

Component (d) preferably comprises at least one organic solvent (d1) in an amount in a range from 90 to 99.9 wt %, more preferably from 92.5 to 99.5 wt %, based on the total weight of (d), and at least one dye (d2) in an amount in a range from 0.1 to 10 wt %, more preferably from 0.5 to 7.5 wt %, based on the total weight of (d), the constituents of component (d) adding up in total to 100 wt %.

Optional Components

The mixer system of the invention optionally comprises at least one component (e).

Component(s) (e) of the mixer system of the invention is/are one or more different organic solvents. Suitable solvents are all solvents which have already been mentioned in connection with component (a2).

Component (e) may optionally comprise at least one additive and/or at least one crosslinking agent. As an additive optionally present in (e), preference is given to using at least one additive selected from the group consisting of antisettling agents. Corresponding products are available commercially and are sold under the name Byk® E410, Aerosil® 200, or Bentone® SD10, for example.

Component (e) preferably comprises at least one organic solvent in an amount in a range from 90 to 99.9 wt %, more preferably from 92.5 to 99.5 wt %, based on the total weight of (e), and at least one additive in an amount in a range from 0.1 to 10 wt %, more preferably from 0.5 to 7.5 wt %, based on the total weight of (e), the constituents of component (e) adding up in total to 100 wt %.

Mixer System

The mixer system of the invention comprises preferably at least one mixing apparatus or at least one mixing station. An example of a suitable mixing apparatus is the HA 450 metering unit from Fast & Fluid, or the CPS Corob D800 metering unit from CPS Color, each especially in combination with a vibratory mixer such as the Skandex SK 550 instrument from Fast & Fluid or the CPS Corob Sample Mix 30 or 90 from CPS Color, or in combination with a biaxial mixer such as the CPS Corob Clevermix 20-10-500-550 device from CPS Color.

The mixer system of the invention preferably comprises a volumetric metering unit as its mixing apparatus. Also suitable alternatively is a mixer system of the invention which comprises a gravimetric metering unit.

The mixer system of the invention is preferably automated, especially so that always the same particular desired shade is obtained. Blending takes place preferably volumetrically.

The mixing apparatus present in the mixer system of the invention preferably comprises suitable metering system control software which performs the automated volumetric mixing for preparing (A), more particularly (A1) and/or (A2), (B) and/or at least one clearcoat composition.

The mixer system of the invention preferably comprises at least one mixing apparatus, the mixing apparatus comprising at least one component (a), more particularly (a-I) and (a-II), a plurality of different components (c), a plurality of different components (d), and optionally at least one component (e). The mixing apparatus present in the mixer system of the invention may optionally further comprise at least one component (b). Alternatively the mixer system of the invention may comprise the at least one mixing apparatus and at least one component (b) present separately therefrom.

Use of the Mixer System

The mixer system of the invention is suitable for producing topcoat compositions and filling compounds. The mixer system of the invention is also suitable for producing clearcoat compositions. The present invention accordingly further provides a use of the mixer system of the invention for producing topcoat compositions and filling compounds and also, optionally, clearcoat compositions.

The mixer system of the invention is preferably used to prepare at least one topcoat composition (A1) employed as edge paint, and/or at least one topcoat composition (A2) different from (A1) and used as retouch paint, and at least one coating composition (B) used as filling compound. Optionally, moreover, at least one clearcoat composition is prepared, preferably from at least one component (a) and at least one component (d).

All preferred embodiments described so far herein in connection with the mixer system of the invention are also preferred embodiments of the mixer system of the invention in the context of its use for producing topcoat compositions and filling compounds and also, where appropriate, clearcoat compositions.

Process for producing topcoat compositions and filling compounds

The present invention further provides a process for producing topcoat compositions and/or filling compounds and also, optionally, clearcoat compositions, which comprises using therefor the mixer system of the invention.

The process of the invention is preferably used to produce at least one topcoat composition (A1) and/or at least one further topcoat composition (A2) different from (A1) and at least one coating composition (B) used as filling compound.

The process of the invention preferably comprises at least one of the steps (1) and (2) and also step (3), these being (1) mixing at least one component (a), such as component (a-I), for example, with at least one pigment paste (c) and optionally with at least one dye solution (d) and optionally with at least one component (e) for producing at least one topcoat composition (A1), and/or (2) mixing at least one component (a), such as component (a-II), for example, with at least one pigment paste (c) and optionally with at least one dye solution (d) and optionally with at least one component (e) for producing at least one topcoat composition (A2), where component (a) in the case of step (2) comprises not only the at least one binder (a1) and the at least one organic solvent (a2) but also at least one matting agent (a3), and (3) mixing at least one component (b) with at least one pigment paste (c) and optionally with at least one dye solution (d) and optionally with at least one component (e) for producing at least one coating composition (B) used as filler compound.

The process of the invention may optionally further comprise a step (4), this being (4) mixing at least one component (a) with at least one dye solution (d) and optionally with at least one component (e) for producing at least one coating composition used as a clearcoat composition.

The topcoat composition (A), more particularly (A1) and/or (A2), and the coating composition used as a filling compound are preferably not prepared until shortly before their intended application in the mixer system of the invention, by mixing of the respective required corresponding components. (A2) is preferably a topcoat composition employable as edge paint, and (A1) is preferably a topcoat composition employable as retouch paint.

In one preferred embodiment, the topcoat composition (A1) employable as retouch paint comprises at least one component (a), such as at least one component (a-I), for example, in an amount in a range from 50 to 95 wt %, at least one pigment paste (c) in an amount in a range from 5 to 30 wt %, at least one dye solution (d) in an amount in a range from 0 to 15 wt %, preferably from 0.1 to 15 wt %, at least one component (e) in an amount in a range from 0 to 30 wt %, based in each case on the total weight of (A1), with the respective proportions in wt % adding up in total to 100 wt %.

In one preferred embodiment, the topcoat composition (A2) employable as edge paint comprises at least one component (a), such as at least one component (a-II), for example, in an amount in a range from 50 to 95 wt %, at least one pigment paste (c) in an amount in a range from 5 to 30 wt %, at least one dye solution (d) in an amount in a range from 0 to 15 wt %, preferably from 0.1 to 15 wt %, at least one component (e) in an amount in a range from 0 to 30 wt %, based in each case on the total weight of (A2), with the respective proportions in wt % adding up in total to 100 wt %.

In one preferred embodiment, the coating composition (B) employable as filling compound comprises at least one component (b), in an amount in a range from 30 to 80%, at least one pigment paste (c) in an amount in a range from 2.5 to 30 wt %, at least one dye solution (d) in an amount in a range from 0 to 15 wt %, preferably from 0.1 to 15 wt %, at least one component (e) in an amount in a range from 0 to 30 wt %, based in each case on the total weight of (B), with the respective proportions in wt % adding up in total to 100 wt %.

The process of the invention is preferably preceded by a step (0) in which the inventively employed components (a), (b), (c), (d), and optionally (e) are first prepared separately and optionally stored, in particular by combining the respective individual constituents and mixing them.

All preferred embodiments described hereinabove in connection with the mixer system of the invention are also preferred embodiments of the mixer system of the invention in the context of its use in the process of the invention for producing topcoat compositions and filling compounds.

Use of the Obtainable Topcoat Compositions and Filling Compounds for Repairing Defects on or in Wood The present invention further provides a use of the topcoat composition (A) obtainable by the process of the invention, more particularly (A1) and/or (A2), and of the coating composition (B) used as filling compound, for repairing defects on or in wood. Over this it is possible optionally to apply a clear composition obtainable from mixing of at least one component (a) and at least one component (d).

Preferably here the topcoat composition (A1) is used as retouch paint, the topcoat composition (A2) as edge paint, and the coating composition (B) as filling compound. After the defect has been repaired with the filling compound in order to compensate unevennesses, and after optional subsequent sanding, thereafter, and preferably after curing of the filling compound, the topcoat composition (A1) is applied as retouch paint to the defect thus treated, preferably if the defect is located amid an at least very largely planar surface, or the topcoat composition (A2) is applied as edge paint to the defect thus treated, preferably if the defect is located on an edge. The topcoat composition (A2) used as edge paint, however, is used preferably to mask edges such as butt edges or milled edges. The filling compound in this case is preferably applied manually, whereas (A1) and/or (A2) are applied preferably by spraying, by means of a pneumatic spray gun, for example. Following the application of (A1) and/or (A2), the repaired defect may optionally be polished.

The defects for repair are located, for example, in corresponding dashboards made of wood or wood constituents in automobiles.

Examples of defects which come into consideration are knotholes or defects resulting from ripped veneers. Butt edges may be a result, for example, of a wooden article having different wood veneer sheets, resulting in a disparate wood structure.

Method for Adjusting and/or Matching Shades

The present invention additionally provides a method for adjusting and/or matching shades of the at least one topcoat composition (A1) and/or at least one further topcoat composition (A2), different from (A1), and of the at least one coating composition (B) used as filling compound, said method comprising using therefor the mixer system of the invention. Obtainable by means of the mixer system are the at least one topcoat composition (A1) and/or the at least one further topcoat composition (A2) different from (A1), and the at least one coating composition (B) employed as filling compound.

All preferred embodiments described hereinabove in connection with the mixer system of the invention are also preferred embodiments of the mixer system of the invention in the context of its use in the method of the invention for adjusting and/or matching shades.

The examples which follow serve to elucidate the invention, but should not be interpreted as having any limiting effect.

A mixer system is employed which comprises a HA 450 volumetric metering unit from Fast & Fluid in combination with the Skandex SK 550 vibratory mixer from Fast & Fluid as mixing apparatus. Introduced into this mixing apparatus are the following components: the mixing apparatus contains at least one—for example, precisely one—component (a-I) and at least one—for example, precisely one—component (a-II). Component (a-II) differs from component (a-I) at least in the presence of at least one matting agent (a3) contained therein. Both (a-I) and (a-II) have a total weight in the range from 15 to 20 kg. The mixing apparatus further contains 4 to 10 components (c), each different from one another, and 5 to 12 components (d), each different from one another. The individual components (c) each have a total weight of 5 to 7 kg, such as 6 kg, for example, and the individual components (d) likewise each have a total weight of 5 to 7 kg, such as 6 kg, for example. This mixing apparatus includes suitable metering unit control software to accomplish the automated volumetric mixing for preparing (A), more particularly (A1) and/or (A2), (B) and/or at least one clearcoat composition. Topcoat compositions (A1) used as retouch paints are prepared by mixing at least one component (a-I) with at least one component (c), optionally at least one component (d), and optionally component (e). Topcoat compositions (A2) used as edge paint are prepared by mixing at least one component (a-II) with at least one component (c), optionally at least one component (d), and optionally component (e). The mixer system further comprises at least one component (b), which has a total weight in the range from 0.5 to 1 kg such as of 0.5 kg, for example. Filling compounds (B) are prepared by placing a component (b), which is part of the mixer system of the invention, under the mixing head of the mixing apparatus and using the mixing apparatus to add to this component, by automated volumetric metering, at least one component (c) and optionally at least one component (d) and optionally at least one component (e). Where, for example, the mixer system comprises in each case at least one component (b) having a total weight in each case of 0.5 kg, the metering unit control software included in the mixing apparatus is configured accordingly to this amount of (b) for the automated preparation of (b).

Set out individually below are exemplary compositions of components (a) to (e):

Components (a)

Component (a-I)

| Constituent | Product employed |
| --- | --- |
| Binder (a1) | Vinnol ® E 15/48 A |
| Organic solvent (a2) | Butyl acetate |

Component (a-I) has a solids fraction, brought about by the polymeric resin present in (1), of 12 wt %, based on the total weight of (a).

Component (a-II)

| Constituent | Product employed |
| --- | --- |
| Binder (a1) | Vinnol ® E 15/48 A |
| Organic solvent (a2) | Methoxypropyl acetate |
| Matting agent (a3) | Syloid ® ED30 |

Component (a-II) has a solid fraction, brought about by the polymeric resin present in (1) and by the matting agent (a3), of 16 wt %, based on the total weight of (a).

Vinnol® E 15/48 A is a polymeric resin with functional hydroxyl groups that is a copolymer of vinyl chloride and an acrylic ester. The fraction of reacted vinyl chloride within the copolymer is about 84 wt %, and the fraction of reacted acrylic ester is about 16 wt %, based in each case on the total weight of the copolymer.

Components (b)

EXAMPLE 1B

| Constituent | Product employed |
| --- | --- |
| Binder (b1) | Ludopal ® 150 |
| Organic solvent (b2) | Styrene |
| Filler (b3) | Barium sulfate |

Example 1b contains 25 wt % (b3), 65 wt % (b1), and 10 wt % of styrene (b2).

EXAMPLE 2B

| Constituent | Product employed |
| --- | --- |
| Binder (b1) | Roskydal ® K 65 |
| Organic solvent (b2) | Styrene |
| Filler (b3) | Talc |

Example 2b contains 20 wt % (b3), 65 wt % (b1), and 15 wt % of styrene (b2).

EXAMPLE 3B

| Constituent | Product employed |
| --- | --- |
| Binder (b1) | Synolite ® 6494 U3 |
| Organic solvent (b2) | Styrene |
| Filler (b3) | Calcium carbonate |

Example 3b contains 15 wt % (b3), 70 wt % (b1), and 15 wt % of styrene (b2).

Roskydal® K65, Ludopal® 150, and Synolite® 6494 U3 are unsaturated polyesters available commercially.

Components (c)

EXAMPLE 1C

| Constituent | Product employed |
| --- | --- |
| Binder (c1) | Laropal ® A81 |
| Organic solvent (c2) | Ethanol |
| Pigment (c3) | Titanium dioxide |

Example 1c contains 15 wt % (c3), 20 wt % (c1), and 75 wt % (c2).

EXAMPLE 2C

| Constituent | Product employed |
| --- | --- |
| Binder (c1) | Laropal ® A81 |
| Organic solvent (c2) | Ethyl acetate |
| Pigment (c3) | Bayferrox ® 3920 |

Example 2c contains 20 wt % (c3), 15 wt % (c1), and 75 wt % (c2).

EXAMPLE 2C

| Constituent | Product employed |
| --- | --- |
| Binder (c1) | Laropal ® A81 |
| Organic solvent (c2) | Butyl acetate |
| Pigment (c3) | Irgazin ® Yellow |

Example 3c contains 20 wt % (c3), 15 wt % (c1), and 75 wt % (c2).

Laropal® A81 is a polymeric condensation product of urea and at least one aldehyde.

Components (d)

EXAMPLE 1D

| Constituent | Product employed |
| --- | --- |
| Organic solvent (d1) | Glycol ether |
| Dye (d2) | Orasol ® Yellow |

Example 1d contains 98 wt % (d1) and 2 wt % (d2).

EXAMPLE 2D

| Constituent | Product employed |
| --- | --- |
| Organic solvent (d1) | Butyl acetate |
| Dye (d2) | Orasol ® Red |

Example 2d contains 99 wt % (d1) and 1 wt % (d2).

Components (e)

EXAMPLE 1E

| Constituent | Product employed |
| --- | --- |
| Organic solvent | Ethyl acetate |
| Additive | Aerosil ® 200 |

Example 1e contains 97 wt % of organic solvent and 3 wt % of additive.

EXAMPLE 2E

| Constituent | Product employed |
| --- | --- |
| Organic solvent | Butyl acetate |
| Additive | Byk 410 |

Example 2e contains 98 wt % of organic solvent and 2 wt % of additive.

Topcoat Compositions

Topcoat compositions employable as retouch paint are obtainable by mixing component (a-I) with at least one component (c), optionally at least one component (d), and optionally component (e).

Topcoat compositions employable as edge paint are obtainable by mixing component (a-II) with at least one component (c), optionally at least one component (d), and optionally component (e).

Filling Compounds

Coating compositions employable as filling compounds are obtainable by mixing one of components (b) with at least one component (c), optionally at least one component (d), and optionally component (e).

Clearcoat Compositions

Colored clearcoat compositions are obtainable by mixing one of components (a-I) with at least one component (d), and optionally component (e).

The sequence in which the individual components are mixed by means of the metering unit is arbitrary: for example, it is possible first to mix at least one component (c) with at least one component (d) and then to add the resulting mixture to a pre-metered amount of a component (a-I), (a-II), or (b). Before the resulting mixture is prepared it is possible optionally first to admix further components (c), (d) and/or (e).

Alternatively, however, it is also possible directly to prepare the respective desired, binder-containing coating composition comprising at least one of components (a-I), (a-II), or (b).

The invention claimed is:

1. A mixer system comprising a volumetric or gravimetric metering plant as a mixing apparatus and comprising at least the following components (a) to (d) and also optionally (e):
    (a) at least one pigment-free component (a) for producing at least one topcoat composition (A), with (a) comprising at least one binder (a1) and at least one organic solvent (a2) and optionally at least one matting agent (a3),
    (b) at least one component (b), different from (a), for producing at least one coating composition (B) used as filling compound, where (b) comprises at least one binder (b1), at least one organic solvent (b2), and at least one filler (b3), where the binder (b1) comprises at least one unsaturated polyester and/or at least one polyurethane,
    (c) a plurality of different pigment pastes different from the components (a), (b), (d), and optionally (e), which in each case independently of one another comprise at least one binder (c1), at least one organic solvent (c2), and at least one pigment (c3),
    (d) a plurality of different, binder-free dye solutions, which each independently of one another comprise at least one organic solvent (d1) and at least one dye (d2), and
    (e) optionally one or more different organic solvents, which may optionally comprise at least one additive and/or at least one crosslinking agent.

2. The mixer system of claim 1, which comprises at least two different components (a), these being at least one component (a-I) for producing at least one topcoat composition (A1), where (a-I) comprises at least one binder (a1) and at least one organic solvent (a2), and at least one component (a-II) for producing at least one topcoat composition (A2) different from (A1), where (a-II) comprises at least one binder (a1), at least one organic solvent (a2), and at least one matting agent (a3).

3. The mixer system of claim 1, wherein the at least one binder (a1) present in the at least one component (a) comprises at least one polymeric resin having at least functional hydroxyl groups and/or carboxyl groups and/or epoxide groups.

4. The mixer system of claim 1, wherein the at least one binder (a1) present in the at least one component (a) comprises at least one polymeric resin having at least functional hydroxyl groups and/or carboxyl groups and/or epoxide groups and being a copolymer of vinyl chloride and at least one ethylenically unsaturated monomer.

5. The mixer system of claim 1, wherein the at least one binder (b1) present in the at least one component (b) comprises at least one unsaturated polyester as polymeric resin, and the at least one organic solvent (b2) likewise present therein is a reactive diluent.

6. The mixer system of claim 1, wherein the at least one binder (c1) present in component (c) comprises at least one polymeric condensation product of urea and/or formaldehyde and at least one aldehyde and/or at least one ketone as polymeric resin.

7. The mixer system of claim 1, wherein the at least one pigment (c3) present in component (c) is selected from the group consisting of inorganic and organic coloring pigments, effect pigments, and mixtures thereof.

8. The mixer system of claim 1, wherein the at least one dye (d2) present in component (d) is selected from the group consisting of basic dyes, fat-soluble dyes, and metal complex dyes, and mixtures thereof.

9. A process for producing topcoat compositions and/or filling compounds and/or clearcoat compositions, the process comprising:
(1) mixing at least one component (a) with at least one pigment paste (c) and optionally with at least one dye solution (d) and optionally with at least one component (e) for producing at least one topcoat composition (A1), and/or
(2) mixing at least one component (a) with at least one pigment paste (c) and optionally with at least one dye solution (d) and optionally with at least one component (e) for producing at least one topcoat composition (A2), where component (a) in the case of (2) comprises not only the at least one binder (a1) and the at least one organic solvent (a2) but also at least one matting agent (a3), and
(3) mixing at least one component (b) with at least one pigment paste (c) and optionally with at least one dye solution (d) and optionally with at least one component (e) for producing at least one coating composition (B) used as filling compound, and
(4) optionally mixing at least one component (a) with at least one dye solution (d) and optionally with at least one component (e) for producing at least one coating composition used as a clearcoat composition,
with the mixer system of claim 1.

10. The process of claim 9, further comprising obtaining at least one topcoat composition (A1) and/or at least one topcoat composition (A2) different from (A1), and at least one coating composition (B), and also, optionally, at least one clearcoat composition.

11. A method of repairing defects on or in wood, comprising applying the topcoat compositions (A1) and/or (A2) and the coating composition (B) obtained in claim 10 to the defects on or in wood.

12. The method of claim 11, wherein the topcoat composition (A1) is applied as retouch paint, the topcoat composition (A2) is applied as edge paint, and the coating composition (B) is applied as filling compound.

13. A method for adjusting and/or determining shades of color of at least one topcoat composition (A1) and/or of at least one further topcoat composition (A2) different from (A1), and of at least one coating composition (B) used as filling compound, the method comprising:
mixing, with the mixer system of claim 1, at least one of the components (a)-(e) and the at least one topcoat composition (A1) and/or the at least one further topcoat composition (A2) different from (A1), to obtain at least one mixed topcoat composition (A1) and/or (A2); and
mixing, with the mixer system, at least one of the components (a)-(e) and the at least one coating composition (B) used as filling compound, to obtain at least one mixed coating composition (B) used as filling compound.

14. A method of repairing defects on or in wood, comprising applying the mixed topcoat compositions (A1) and/or (A2) and the mixed coating composition (B) obtained in claim 13 to the defects on or in wood.

15. The method of claim 14, wherein the mixed topcoat composition (A1) is applied as retouch paint, the mixed topcoat composition (A2) is applied as edge paint, and the mixed coating composition (B) is applied as filling compound.

* * * * *

UNITED STATES PATENT AND TRADEMARK OFFICE
CERTIFICATE OF CORRECTION

PATENT NO. : 10,427,187 B2
APPLICATION NO. : 15/037588
DATED : October 1, 2019
INVENTOR(S) : Alexander Blaser et al.

Page 1 of 2

It is certified that error appears in the above-identified patent and that said Letters Patent is hereby corrected as shown below:

In the Specification

Column 4, Line 62, "Lacke and Druckfarben" should read -- Lacke und Druckfarben --;

Column 6, Line 8, "and and also" should read -- and also --;

Column 6, Line 38, "binders (1)," should read -- binders (a1), --;

Column 6, Line 48, "binder (1)," should read -- binder (a1), --;

Column 6, Line 56, "binders (1)," should read -- binders (a1), --;

Column 7, Line 6, "binder (1)," should read -- binder (a1), --;

Column 8, Lines 29-30, delete "Component (a)..........agent (a3)." and insert the same in Column 8, Line 28, as the continuation of same paragraph;

Column 9, Line 1, "binder (1)" should read -- binder (a1) --;

Column 9, Line 46, "content (1)." should read -- content (a1). --;

Column 12, Line 14, "Lacke and Druckfarben" should read -- Lacke und Druckfarben --;

Column 12, Lines 27-29, delete "at least one........weight of (b), and" and insert the same in Column 12, Line 28, as the new paragraph;

Column 12, Lines 29-32, delete "at least one filler........weight of (b), and" and insert the same in Column 12, Line 30, as the new paragraph;

Column 13, Line 8, "is 1.7." should read -- is ≥ 1.7. --;

Signed and Sealed this
Ninth Day of June, 2020

Andrei Iancu
*Director of the United States Patent and Trademark Office*

Column 14, Line 15, "Lacke and Druckfarben" should read -- Lacke und Druckfarben --;

Column 19, Line 48, (approx.), "in (1)," should read -- in (a1) --;

Column 19, Line 60, "present in (1)" should read -- present in (a1) --.